April 10, 1928.  
L. A. LAURSEN  
1,665,310  
PROCESS AND APPARATUS FOR VULCANIZING RUBBER ARTICLES  
Filed Sept. 27, 1924  2 Sheets-Sheet 2
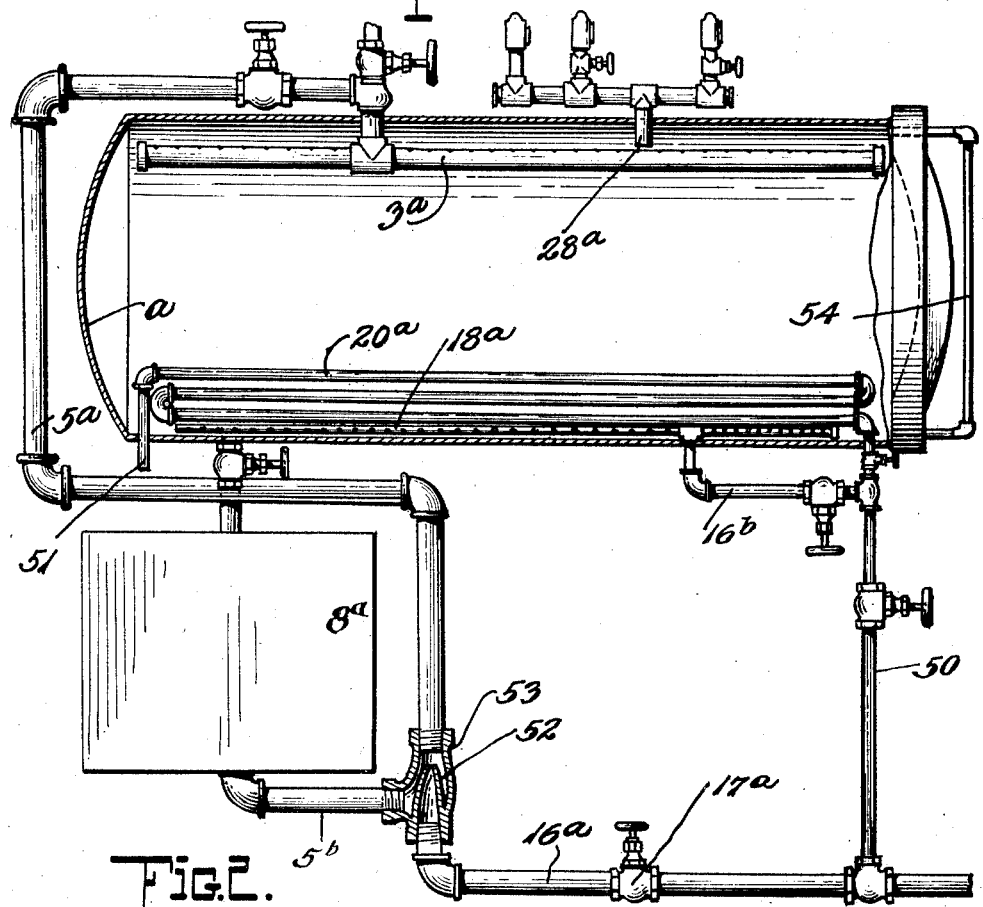
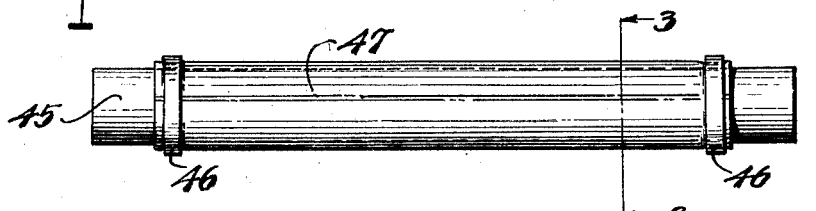
Inventor  
L. A. Laursen Patented Apr. 10, 1928.

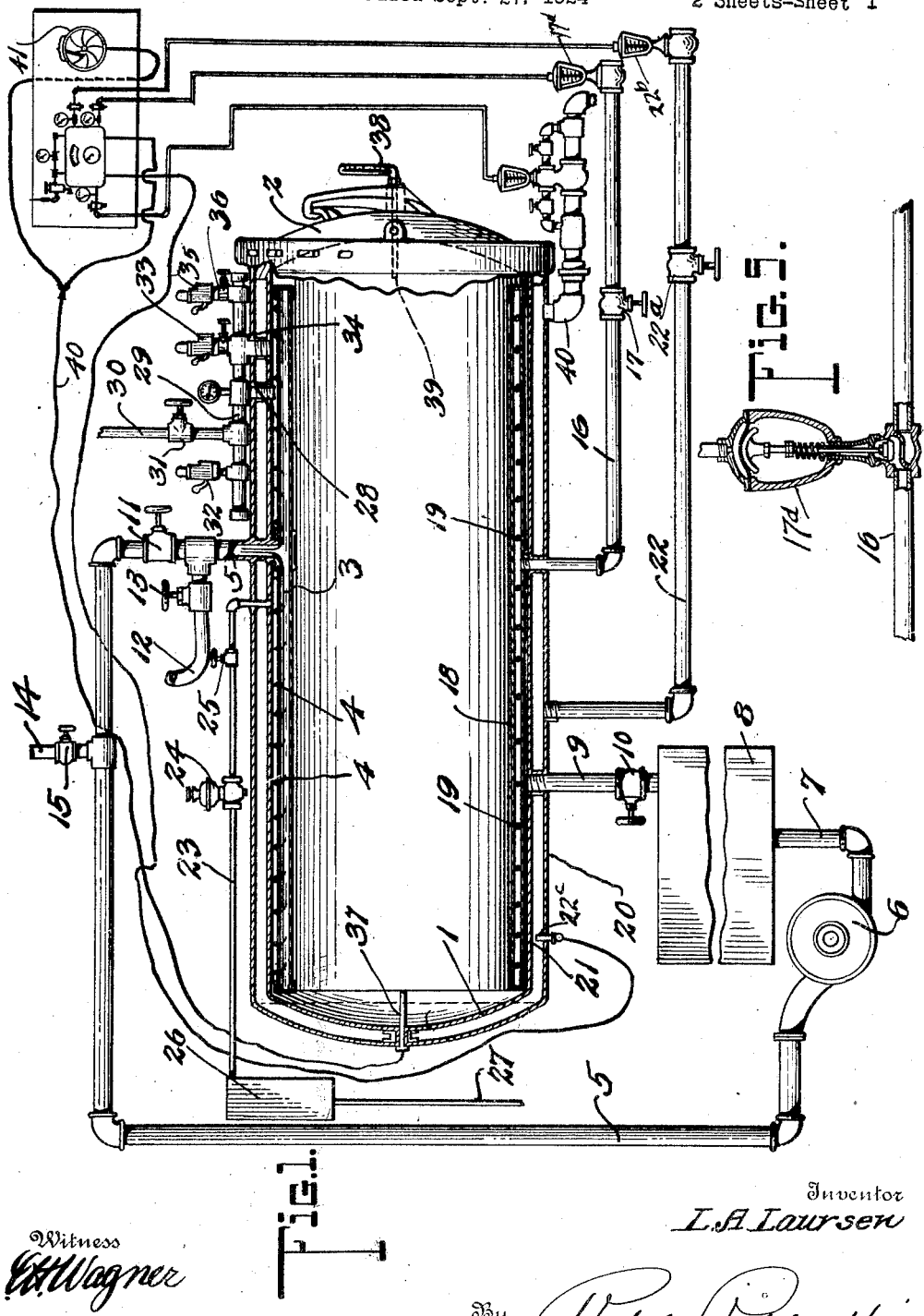

1,665,310

UNITED STATES PATENT OFFICE.

LAURITS A. LAURSEN, OF EAU CLAIRE, WISCONSIN, ASSIGNOR OF ONE-FOURTH TO PEARL FISHER LAURSEN, OF AKRON, OHIO.

PROCESS AND APPARATUS FOR VULCANIZING RUBBER ARTICLES.

Application filed September 27, 1924. Serial No. 740,308.

This invention has to do with the art of rubber manufacture, and involves primarily certain novel apparatus, and a novel process, useful for the manufacture of rubber tubes, especially of the kind employed as inner tubes of vehicle tires.

One aim of this invention has been to provide an apparatus and process by which it is rendered possible to eliminate the necessity of wrapping the rubber stock rolled about the mandrels or poles on which the tubes are formed, with fabric strips or rags, as is the usual procedure today.

The foregoing method, which need not be described in detail, because it is well known to those versed in the art, involves extra time and labor incident to the fabric wrapping operation, as well as the need to employ the wrapping material, which involves additional expense, all features of a process which is costly and desirable to do away with.

In the practise of the present invention, I dispense entirely with the fabric wrapping process above mentioned, utilizing instead, a process which includes the submergence of the mandrels or poles having the rubber stock wrapped around them, in water. The water is then heated to bring it to a vulcanizing temperature and subjected to high pressure sufficient to cause a close adherence between the rubber stock and the poles or mandrels about which it wraps in forming the tubes. In effect, I utilize hydraulic pressure therefore, to maintain the rubber stock in close contact with the poles or mandrels while being cured, liability of blisters or blemishes or other defects being avoided.

A special feature of the invention resides in the employment of means for causing thorough circulation of water in the heater in which the tubes in raw state are introduced, this circulation maintaining the water at uniform temperature as it acts upon all of the tubes, a large number of which are handled in each batch introduced into the heater.

I employ soapstone or mica or the like in the heater so as to mix with the water, for the purpose of preventing the gum stock, of which the tubes are made, from sticking together. I utilize the circulation means for the water in the heater to properly mix this soapstone or mica product with the water so that it may be uniformly distributed over the tubes to facilitate the stripping of the latter from the poles or mandrels in the removal operation. I have found in practise, that the use of the soapstone in the manner above mentioned, in the operation of vulcanizing the tubes, maintains the tubes with a nice fluffy appearance when the curing of the same has been completed, and, furthermore, so well distributed is the soapstone in the operation of my process that it forms a thin, even coating on the tubes received by the latter while the gum stock is soft. Under the conditions the soapstone does not come off but, in fact, is practically cured into the stock of the tube itself and this is advantageous, because, after the tube is completed and packed up, there is little or no liability of the same sticking or clinging together at its inner walls after it has been in the box for some time.

This invention involves, furthermore, certain novel apparatus, and process phases, having to do with the method of heating water in the vulcanizing chamber, or heater, the method of feeding the water over the tubes while they are in their raw state, and certain other general provisions in the way of automatic operating valves controlling the pressures useful within the vulcanizing chamber under different conditions, depending upon the stage of advancement of the operation of curing the rubber articles.

In the accompanying drawing, Fig. 1 is a sectional view of an apparatus designed in accordance with the principal features of my invention.

Fig. 2 is a side view of a pole or mandrel having rubber stock wrapped therearound to provide a tube in the preliminary form which it receives for purposes of vulcanizing.

Fig. 3 is a sectional view taken about on the line 3—3 of Fig. 2.

Fig. 4 is a sectional view of a modified form of apparatus useful for the purpose of the invention.

Fig. 5 is a view of one of thermostatic controllers for certain valves.

Referring to Fig. 1 I shall describe first the general construction of my apparatus.

The heater, or vulcanizing chamber, is designated 1 and is of a suitable size to receive a truck or vehicle on which may be arranged quite a large number of poles, about which are wrapped the rubber stock sections that are made up in the form of tubes when so disposed upon said poles. In other words, the heater 1 will hold quite a large number of poles supplied with the rubber stock, as shown in Fig. 2.

The heater 1 is preferably closed at one end and is equipped at its opposite end with a removable door 2 adapted to be clamped in closed position by any suitable clamping means well known in the art. Near the top of the heater 1 is a water supply or inflow pipe 3 having apertures at its upper side as shown at 4, said inflow pipe extending longitudinally of the heater and being connected with a supply pipe 5 which leads to a pump or any suitable water forcing means designated 6, said pump being connected by a pipe 7 with a hot water well or tank 8. A drain pipe 9 leads from the bottom of the heater 1 into the top of the tank or well 8, a valve 10 controlling the passage of water through the pipe 9.

The pipe 5 is equipped with a valve 11 controlling the passage of water from said pipe into the water inflow pipe 3 and thence into the heater 1. Leading off from the pipe 5, above the heater 1 is a cold water pipe 12 having a control valve 13. Joined with the pipe 5 also at some suitable point in its length is a steam pipe 14 for supplying steam to the water pipe 5 under the control of a valve 15. The purpose of this steam supply is to heat the water pumped or otherwise forced through the pipe 5 to be hereafter more fully explained.

Leading into the bottom of the heater 1 is a steam pipe 16 having a control valve 17 and connected with a long steam inflow pipe 18 located at the bottom of the heater 1 and having steam exit openings 19 leading through the sides thereof. If desired, the heater 1 may be equipped with a surrounding casing 20 spaced therefrom to provide a steam or heating chamber 21, and in order to supply steam to said chamber 21 I provide a steam pipe 22 which leads into the bottom of the casing 20.

For supplying air under pressure to the interior of the heater 1, I utilize an air pipe 23 equipped with a pressure regulating valve 24 adapted to close automatically when pressure in the heater 1 reaches a point of about 150 lbs. The pipe 23 is provided with a control valve 25 by which the passage of air through said pipe into the heater 1 is cut off or permitted. The air pipe 23 leads to a compressed air tank 26 from which leads a pipe 27 that is connected in any suitable way with an air compressor of conventional type, not illustrated.

A condensation drain pipe 40 is also located at the bottom of the heater with a suitable condensation drain trap and valves.

At its upper portion there is connected with the heater 1, a short, vertical pipe 28, to which is attached a header pipe 29. Connected with the header pipe 29, is a vent pipe 30, controlled by the valve 31. Connected with the header pipe 29 is a safety valve 32 which is set for a fixed pressure, for safety only. This pressure is preferably fixed at a point exceeding 150 to 160 lbs. at which the valve 32 will let off pressure.

A second safety or relief valve 33 is connected with the header pipe 29 and a control valve 34 is connected up between the valve 33 and the header pipe 29 and is adapted to let off pressure at a point about 60 lbs. Still another safety or relief valve 35 is connected up with the header pipe 29 and is so set as to let off pressure at a point somewhere between 10 and 20 lbs. There is likewise a control valve 36 between the valve 35 and the header pipe. These various valves have to be set or adjusted especially dependent upon the stage of the process of handling the rubber tube according to the method which will be more fully presented hereinafter.

There is provided a recording thermometer bulb 37 extending through the left hand end of the heater 1 and casing 20 and projecting some distance into the heater 1, a sufficient distance to become submerged in the water that may be circulated in the heater, so that the thermometer may properly record temperatures within the heater. Likewise, at the opposite end of the heater 1 and mounted upon the door 2, is a reading thermometer 38 which has a bulb 39 in the heating zone of the heater. The steam pipe 22 casually mentioned, has a valve 22$^a$ which controls the passage of steam therethrough into the heating chamber 21. There will preferably lead from the recording thermometer bulb 37 a thermometer cord 40 connected up with the recording thermometer 41 which may be located quite a distance from the vulcanizing apparatus proper.

Having in view the construction of my apparatus in accordance with the foregoing, the operation of the apparatus in commercial use for curing rubber tubes is substantially as follows, pursuant to the method of my invention.

Having supplied a batch of poles or mandrels 45 with rubber stock suitably wrapped around the same to provide the tube body, and each pole having been supplied with cured rubber bands 46 clamping the ends of the rubber stock thereto, the batch of poles and mandrels may be introduced into the heater or vulcanizing chamber 1 through the door 2. The longitudinal seam 47 provided by wrapping the rubber stock about each pole 45 may be rolled down in order to flatten the same against the body of the stock as closely as possible preliminary to the vulcanizing operation. The poles 45 will preferably be carried by a truck adapted to be wheeled into the chamber or heater 1 on tracks that may be provided in said heater. A suitable quantity of soapstone is placed in the heater 1 when the various poles with the rubber stock rolled about them are introduced into the heater, and then the door 2 is closed.

The next step is to open the valve 31 of the vent pipe 30 and then open the valve 17 of the steam pipe 16 so as to admit steam into the vulcanizing chamber to expel the contained air and to heat the chamber to a temperature of about 212 degrees F. thereby to soften the gum stock, the rubber bands 46 becoming imbedded in the end portions of each tube formed by said stock wrapped about each pole. Most of the air will pass out of the vulcanizing chamber through the drain pipe 9 leading into the hot water tank 8 and whose controlling valve 10 is open at the time. The valve 31 is open as a precaution against the creation of any moisture under pressure in the heater 1 that might enter between a pole 45 and the rubber stock rolled therearound, and cause blemishes. This moisture would enter, if at all, between the overlying portion of the rubber stock intermediate of its ends and not at the ends where the rubber bands 46 effectively close the end portions of each wrapped piece of stock. This preliminary softening of the rubber tubes is also very advantageous for forming and skiving the ends of the tubes during the process of vulcanization, and especially when that operation is performed by the use of washers such as are shown and described in my prior Letters Patent No. 1,530,128, dated March 17, 1925.

If my vulcanizing chamber or heater 1 is equipped with a surrounding heating chamber 21, steam may be admitted to this chamber 21 in order to assist in preliminary heating of the rubber stock by the application of external heat to the heater 1.

I make the reservations, "If the heating chamber 21 is employed", because I may use or dispense with this heating chamber, employing other heating means for accomplishing the same result, but of different construction, as will be later pointed out.

The softening of the rubber stock in the manner above set forth is accomplished by maintaining the heat of the steam within the heater 1, or external heat, at low pressure, and for a period of approximately three minutes.

The softening process above mentioned is not absolutely necessary but gives the best results in the practice of my invention, because, if it is not used, many tubes are damaged by the entrance of moisture or water along the free edge or seam line of the piece of rubber stock wrapped about each pole, or otherwise. Therefore, the softening is highly desirable and important to obtain the best results for commercial practice.

The softening of the rubber stock on the poles 45 having been completed, the valve 17 in the pipe 16 is closed, the valve 31 of the pipe 30 is closed and also the valve 10 of the pipe 9, which is a drain pipe.

Thereafter, compressed air is admitted to the heater 1 by opening the valve 25 in the compressed air pipe 23 leading from the reservoir 26 and a pressure of approximately 5 lbs. is created in the heater 1, this being sufficient to prevent a vacuum from forming in the heater when water is later introduced and which would cause condensation of steam admitted thereto. This step, however, may be dispensed with when the heating chamber 21 is employed, as the heating effect of that chamber would serve to prevent the creation of a vacuum in the vulcanizing chamber under the conditions stated.

The pump 6, or any other suitable means for forcing water into the heater 1, is now started. I shall describe a little later a definite means for forcing the water into the heater, useful under certain conditions where high steam pressure is obtainable and by which I eliminate the employment of pump 6. The water is forced by the pump 6 supplied from the pipe 7, through the pipe 5 and into the heater 1 by means of the pipe 3. For this operation the valve 11, of course, must be open, and the water enters the heater 1 through the perforations at the top of the pipe 3 as previously described. Under these conditions the water is gently sprayed over the various tubes that are mounted on the poles 45 in the vulcanizing chamber, and I have found this method of introducing the water into the heater 1 to give the best results. When the water is first introduced into the chamber 1, the air pressure of about 5 pounds above referred to is lowered to nearly zero, since the temperature within the heater is lowered by the entering water which at that time is usually about 210° F.

The water gradually fills the heater and steam is admitted into the heater through the steam pipe 16 and the perforated pipe 18 at the bottom of the heater, and this steam mixes with the water as the steam issues from the holes 19 at the sides of the pipe 18. The steam thus introduced into the heater performs two functions, namely, first, it has the tendency to heat the water, and secondly, it causes a circulation of the water in the heater 1 so as to compel the water to maintain a substantially uniform temperature. Additionally, this circulating function of the steam tends to thoroughly distribute the soapstone placed in the heater, in the water, whereby the soapstone will have a tendency to apply itself uniformly over the surfaces of the tubes being treated in the vulcanizing chamber.

I wish it to be understood that I may use other means for circulating the water as above set forth, either mechanically or in any suitable manner, but it is most desirable that the water circulation be employed as the water is brought to vulcanizing temperature.

As the water rises within the heater, there is built up therein a gradually increasing pressure, for which reason the control valve 36 is opened so as to permit the operation of the relief valve 35, and air will escape from the relief valve 35 which is adapted, however, to maintain a uniform pressure in the heater 1, a pressure higher than the prevailing temperature pressure within the heater. The valve 35 is designed to let off pressure at some point between 10 and 20 lbs., in performing its function, and were it not provided there would be a tendency for the gum stock to bag or sag away from the pole owing to the heat between the latter and said stock, which heat does not radiate fast enough as the stock is a non-conductor thereof. Defective tubes would thus result.

When the heater is full of water to a point of submergence of all of the poles, with the tubes encircling them, the valve 36 is closed, the valve 35 being free to act previously to relieve excess pressure as above pointed out. The valve 11 is also closed, cutting off the supply of water and the valve 34 is opened so as to bring into action its automatic relief valve 33 which lets off pressure at about 60 lbs. The steam now continues to enter the chamber or heater 1 through the pipes 16 and 18 for the purpose of bringing the water in said chamber to the desired vulcanizing temperature of approximately 288 degrees F. to 300 degrees F., whereupon the valve 17$^d$ closes automatically. This vulcanizing temperature is thereafter maintained by the heating chamber or jacket 21 which surrounds the vulcanizing chamber. The valve 34 is now closed, and if need be the valve 17 also, and then the valve 25 in the compressed air line is opened so that the pressure regulating valve 24 may be operative to regulate the pressure. This valve 24 is set to maintain the pressure in the chamber 1 up to a point from 125 lbs. to 150 lbs. This is the desired vulcanizing pressure. I depend upon the air pressure entering the heater or chamber 1 from the pipe 23 to cause the rubber stock surrounding the poles 45 to be forced thereagainst, during the vulcanizing operation caused by heating in the chamber or heater 1 to the degree of heat just above mentioned.

Furthermore, it is notable that while I use steam for bringing the vulcanizing chamber to the vulcanizing temperature necessary for curing the tubes on the poles 45, the said steam does not have direct contact with the rubber stock being cured, owing to the fact that the stock is submerged in the water, and entering steam is condensed to water by maintaining a pressure higher than the temperature pressure.

The automatic operation of the valve 17$^d$ may be effected in different ways, but is preferably caused by using a thermostatically controlled diaphragm. The thermostatic means include the thermostatic bulb 37 before referred to and which is submerged in heater 1 and so connected to a suitable instrument or device operated by compressed air, as to turn off the diaphragm valve when the temperature created in the heater 1 has reached the maximum degree desired. A similar arrangement is employed for controlling the temperature of the heating chamber 21 and comprises the automatically controlled valve 22$^b$ operated from the thermometer bulb 22$^c$ located in the condensation trap of the heating chamber. Thermostatic arrangements of this kind are well known in many arts and I do not propose any special novel construction of these devices, but may employ any conventional type suitable for the purposes of my present invention. By the employment of the high pressure of the water in the chamber or heater 1 as above described and for the purpose stated, all possibility of blisters, blemishes or defects in the formation of the tubes applied to the poles 45, is avoided. The maximum pressure must be applied to the water surrounding the tubes before the gum stock becomes set incident to the raising of the temperature in the heater to a sufficiently high degree to cause vulcanization or curing. Moreover, this pressure must be higher than that of the temperature of the water in the heater 1 when it is raised to the vulcanizing temperature, as by the introduction of the steam. In other words, the pressure of the water in the heater 1 at vulcanizing temperature is not an operative pressure to maintain the rubber stock (when fabricated in the manner before described) in close contact with the poles 45, wherefore, I have had to have recourse to the creation of a special pressure maximum in the heater for the purpose set forth.

It is to be understood that with the process of this invention the small amount of air which may be under or between the plies of gum stock rolled about each pole, or may be between the gum stock and the pole or mandrel itself, does not have to be expelled before placing the poles in the heater. A high enough pressure is maintained during the vulcanization to compress this atmospheric air into such a small space that it will leave no blemishes or marks in the gum stock after the same has been cured.

The advantages of my process will be evident as compared with the ordinary method of wrapping the gum stock with rags or fabric in order to maintain the same sufficiently close to the poles to provide good results in the curing operation. In my method I rely wholly upon the hydraulic means, avoiding entirely the use of these rags for the gum stock, and consequently avoiding all of the expense incident to the time and trouble of applying the wrapping of fabric and removing same. Of great consequence, furthermore, I obtain by my invention, a uniform proposition instead of one that is not uniform on account of the fact that it is almost impossible to apply the wrapping of fabric to the gum stock with equal pressure and, therefore, the tube created by the old method is not absolutely insured to be of uniform thickness, for which reason defects often arise in the ultimate product.

After the gum stock or tubes have been cured or vulcanized to the desired point (where the rubber has attained a permanent set), or nearly so, the water in the heater 1 is drawn out through the valve 10 into the hot well or reservoir 8, and this way be done very quickly or slowly. During this operation the steam in the water will escape and maintain in the heater 1 very nearly the same temperature on the now practically cured tubes, as if they were in the water, and the final curing of the same will be completed while the heater 1 is emptying of its liquid contents.

Should the door 2 be opened and the tubes on the poles 45 removed from the heater 1 soon after the water has been drawn therefrom, there would be a tendency of the tubes to belly away from the poles 45 owing to the fact that the rubber is not a conductor of heat and therefore will not let the heat between the tube and pole escape. The heat thus entrapped causes the tube to belly or balloon, and as the tubes are very hot they will become misshapen. Before opening the door 2, I start the pump or water forcing or injecting means 6 into operation and water is thus carried from the hot well 8 and again forced through the pipe 3 into the heater and sprayed down over the now cooling and practically cured tubes on the poles 45. By spraying the tubes with this hot water, having now a heat of 210° F. or atmospheric pressure, for a short time, some decided advantages are secured. In the first place the heater does not cool below a temperature of about 210 degrees; secondly, the poles cool sufficiently to prevent the separation of the rubber tubes therefrom, and yet they do not cool enough to create a vacuum and the resultant sticking of the tubes thereon, which sticking would cause hard work in stripping the tubes off of the poles. When the water empties from the heater 1 into the hot well a certain amount of steam will escape and the water in the hot well is left usually at a temperature of about 210 degrees or about the boiling point, this being desirable because it facilitates when desired the reuse of the water as a heating medium for the heater 1 in the preliminary process of softening the rubber tubes after initial introduction into the heater 1. Of course the warmer the water when placed in the heater 1 the less energy is required to heat it and this makes for uniformity of temperature in the heater 1, a reduction of the expense of operating my vulcanizing apparatus.

If desired, the steam pipe 14, having the valve 15, may be used to introduce steam into the water passing through the pipe 5 to raise the temperature of said water. A saving of time is effected by heating the water in the manner above described, and, furthermore, it is desirable to heat the water as it enters the heater 1 and falls upon the various tubes held in position on their poles or mandrels, in order that the tubes may be uniformly heated. In other words, by this method there is no tendency to cure the tubes at the lower part of the heater and ahead of those at the upper part. Whenever the pump 6 or water introducing means is discontinued in operation, the valve 15 is closed to cut off the supply of steam from the pipe 14, so that the water will be heated only by the steam entering the heater 1 through the pipe 16.

The cold water main or supply pipe 12 with its valve 13, are provided for emergency purposes only to protect the loads of uncured tubes from spoiling should the pump 6 become inoperative, accidentally or otherwise, after the poles have been heated up. Should the pump 6 be stopped by accident, the valve 11 would be closed and the valve 13 opened so that cold water under pressure may be forced through the pipe 3 and sprayed over the gum stock or tubes in the heater, so that these are cooled. Before introducing the cold water in the above manner, however, it is required that compressed air be admitted into the heater 1 to prevent the tendency to formation of a vacuum in the heater.

The valve 34 under the safety or relief valve 33 is opened when steam is admitted into the water in the heater 1, because the steam will condense and an outlet must be provided for the compressed air and surplus water so that a uniform pressure in the heater may be maintained. The safety valve 32 is set for a fixed pressure and will release the pressure when it reaches a point about between 150 and 160 lbs., as previously suggested. It will be understood, however, that the apparatus and process do not depend in any way upon the use of any given number of relief valves or the setting of the valves to blow off at any particular pressure. For example, the valve 35, referred to as a 20 lb. relief valve, is used mainly to accommodate the force pump 6, which under such conditions may be operated to supply the water from the tank 8 to the heater 1 under a relatively low pressure. Obviously, if desired, the valve could be set to blow off at a higher pressure, so long as the pump were capable of working against the increased pressure. In the case of the valve 33, referred to as a 60 lb. relief valve, its main utility is to accommodate the steam pressure employed in heating the water, allowing the use of relatively low pressure steam. Again, it will be obvious that this particular valve could be set to blow off at a higher or even lower pressure according to the pressure of the steam used in heating the water. As to the valve 24, it is used in determining the final pressure which it is desired to create in the heater 1, and if other conditions permitted, might be used alone in permitting the pressure to be gradually built up as the water fills the heater. Naturally the pressure within the heater may be varied at any stage of vulcanization by admitting air into the heater from the compressed air tank under the control of the valve 25, the particular pressure created within the heater being limited only by the setting of the relief valve. In short, the several valves herein shown and described are availed of to render the operation of the apparatus and the practice of the process thoroughly flexible under all conditions of use, the different pressure settings stated being given only for purposes of illustration.

I illustrate in Fig. 4 a modified type of my apparatus, one which, however, is greatly adapted to perform the functions and carry out the method that has been described in reference to the construction hereinbefore set forth in detail. On the modification 1ª denotes the heater, 3ª the water supply pipe at the top thereof, 18ª the steam supply pipe at the bottom thereof, 5ª the pipe which leads from the hot well 8ª to the supply or inflow pipe 3ª, and 20ª the independent means for heating the heater 1ª which takes the form of a coil within the heater. This coil 20ª is for the same purpose as the heating chamber 21, or the casing 20 of the previously described apparatus. The coil 20ª is heated by running a branch pipe 50 from the steam pipe 16ª, up into the heater 1ª, there being an outlet steam pipe 51 leading from the end of the coil 20ª opposite that connected with the branch pipe 50. The branch pipe 50 is connected by pipe 16ᵇ which supplies steam to pipe 18ª at the bottom of the heater 1ª.

On this construction of my apparatus I have novel means for forcing the water from the hot well 8ª through the pipes 5ª and 3ª into the heater 1ª. This novel means involves the use of a pipe 5ᵇ which leads from the bottom of the hot well 8ª and connects with an injector or water lifter 52, having the injector nozzle 53 with which the pipe 16ª communicates or is connected. The injector nozzle 52 is adapted to supply steam under the control of the valve 17ª, to the pipe 5ª and thus force the water delivered from the hot well 8ª into the heater, when the valves are properly adjusted for the purpose. The steam injector 52 and nozzle 53 are well known and may be of any conventional type, so that the arrangement is herein shown more or less diagrammatically. This method of introducing water into the heater is very advantageous, because the steam is utilized for executing or forcing the water to the point of delivery, and the amount of water carried into the heater 1ª and the desired pressure may be regulated by the control valves. By utilizing the steam pressure a saving of expense is accomplished and the use of extra special machinery for the purpose avoided. This method of handling the water is especially useful where the pressure available is from 125 to 150 lbs. of steam, and obviously the water is heated at the same time that it is carried into the heater 1ª, reducing the time factor required for bringing the water to the proper ultimate vulcanizing temperatures.

As the water is forced into the heater 1ª in the above manner, the air compressed in the heater will escape out through the suitably provided pressure relief valve, as hereinbefore set forth.

When the water in the heater 1 or the heater 1ª practically fills the heater, or at least sufficiently fills it to reach the pipe 28 or the valves 11 and 25 are closed, in the structure of Fig. 1. Under these conditions the steam will enter the heater 1 through the pipe 18 and the heater 1ª through the pipe 18ª and the circulation of water results.

The valve arrangements of the modified form of the invention are likewise substantially the same in principle as those in the preferred form. The pipes 28 and 28ª with the relief valves 33 connected therewith, permit the air to pass from the heater until the water reaches the bottom or mouth of the pipes 28 or 28ª, as the case may be, and thereafter the water will be permitted to pass out though there would still be an air cushion on top of the water. This is a method of relieving the pressure of air and water when it is above the limit desired in the heater.

With the foregoing description, bearing in mind that the principal operation of the construction of Fig. 4 is the same as that of Fig. 1, except as to the water injecting phase, certain detailed features of the modification are not further entered into. It is notable, however, that I use a water gauge 54 at the door end of the heater 1ª so as to advise the operator of the apparatus as to the exact level of water in the heater 1ª. A similar water gauge may be provided for the apparatus of Fig. 1.

When the apparatus of Fig. 4 is employed, wherein I use the water lifter or the injector feature 53, it is not necessary to supply air to the receptacle or to the heater 1ª, before starting the water into the heater immediately after the softening process. The gum stock of the tubes or the rubber articles in the heater is softened with steam, without the use of pressure at about 210 degrees F., the steam issuing into the heater 1ª through the apertures in the pipe 18ª. After the tubes or articles have been softened about three minutes, according to the method which has been previously described, if water is forced into the heater 1ª by the injector nozzle 53, the steam which carries the water to the heater from the hot well or reservoir 8ª will turn part of the water into steam as it enters the heater 1ª through the pipe 3ª, and in the operation of delivering the water to the heater a tendency to create a vacuum in the heater will thus not be caused. Under some conditions when the water in the reservoir 8ª is cooled, as on Monday morning, for instance, after the factory has been shut down it is necessary to supply compressed air to the heater 1ª in the manner which has been fully described in the first part of this specification in relation to the construction of Fig. 1.

Having in view the utility of my invention for purposes other than making tire tubes, it is, of course, evident that the poles or mandrels 45 are formers upon which the rubber article is shaped as described. The casing 20 is, broadly speaking, a heater, and in performing such function is substantially equivalent to the heater comprising the coil 20ª of the modified form of the invention. The injector means 52—52 of Fig. 4 and the pump 6 of Fig. 1 are water forcing means and so considered are equivalent, broadly differentiating of course as to specific functioning.

The word spray or spraying employed in the specification and claims is used in a broad and general sense and is not intended to refer to any particular form of spray or to any particular mode of producing a spray unless otherwise indicated.

Having thus described my invention what I claim as new and desire to secure by Letters Patent is,

1. The herein described method of vulcanizing rubber articles, consisting in shaping the article upon a former and sealing the space between the article and the former, and placing the article while on the former in a heater, introducing steam into the heater to expel the air from the latter and to soften the rubber stock of the said article, then admitting air under low pressure to the heater, submerging the article in water, feeding steam to the water to raise its temperature to vulcanizing heat, and subjecting the article while submerged and while the water is at vulcanizing heat to a sufficiently high pressure to compress the rubber stock of the article firmly about the former to eliminate all air blisters.

2. The herein described method of vulcanizing rubber articles, consisting in shaping the article upon a former and sealing the space between the article and the former, and placing the article while on the former in a heater, introducing steam into the heater to expel the air from the latter and to soften the rubber stock of the said article, then admitting air under low pressure to the heater, submerging the article in water, feeding steam to the water to raise its temperature to vulcanizing heat, and subjecting the article while submerged and while the water is at vulcanizing heat to a sufficiently high pressure to compress the rubber stock of the article firmly about the former to eliminate all air blisters, maintaining the said pressure until the rubber article has obtained a permanent set incident to curing, removing the water from the heater, and spraying the rubber stock of the article with water, and then removing said rubber article from the heater.

3. The herein described process of vulcanizing rubber articles, which consists in shaping the article on a former and sealing said article to the former so as to prevent the admission of air or moisture between the article and the former, then placing the uncured article in a heater, admitting steam to the heater so as to cause the air therein to be forced therefrom, then admitting air under low pressure to the heater, then submerging the rubber article in water, then causing steam to enter the water, permitting any air in the heater to escape as the steam entering the water condenses, maintaining a pressure on the water higher than the pressure of the steam or heat in the water, then applying additional pressure to the water to compress the rubber stock of the rubber article and expel all air in the same, and subjecting the article to vulcanizing heat.

4. The method of vulcanizing rubber tubes which consists in shaping an uncured piece of rubber stock about a former to create a tubular formation of said rubber stock, placing the rubber stock in a heater while on the former, subjecting the rubber stock to low pressure to cause it to closely adhere to the former, submerging the rubber article in a liquid, causing circulation of said liquid with soapstone therein around the rubber article while submerged, and raising the liquid to a vulcanizing temperature for curing the article, maintaining the liquid and the article submerged therein under high presure while the curing of the rubber article is being effected.

5. A vulcanizing apparatus comprising a heater, means for supplying water to the heater to submerge uncured rubber articles therein, means for heating the water as it enters the heater, means for causing a circulation of the water in the heater comprising a source of steam supply connected with the heater to cause the steam to enter the water, means whereby air in the heater may be permitted to pass out therefrom as the water enters the heater, or is heated therein, and temperature and pressure recording means for the heater.

6. A vulcanizing apparatus comprising a heater, means for supplying water to the heater to submerge uncured rubber articles therein, means for heating the water as it enters the heater, means for causing a circulation of the water in the heater comprising a source of steam supply connected with the heater to cause the steam to enter the water, means whereby air in the heater may be permitted to pass out therefrom as the water enters the heater, or is heated therein, temperature and pressure recording means for the heater, and means whereby water may be sprayed over the rubber articles in the heater, as the heat in the heater is reduced from the vulcanizing temperature.

7. The method of vulcanizing rubber articles, which consists in placing the articles to be vulcanized in a suitable receptacle, admitting steam into said receptacle while vented to the atmosphere to soften the articles, then admitting into the receptacle while closed to the atmosphere water or an equivalent liquid to submerge the articles, and then heating the water sufficiently to raise it to the desired vulcanizing temperature.

8. The method of vulcanizing rubber articles, which consists in placing the articles to be vulcanized in a suitable receptacle, and admitting into said receptacle water or an equivalent liquid while in a heated condition and distributing said water onto all of the articles simultaneously or substantially so to insure the uniform heating of the articles.

9. An improvement in the method of vulcanizing rubber articles, which consists in spraying water or an equivalent liquid while in a heated condition simultaneously or substantially so onto all of the articles to be vulcanized.

10. The method of vulcanizing rubber articles, which consists in spraying water or an equivalent liquid while in a heated condition simultaneously or substantially so onto all of the articles to be vulcanized, and then heating the water sufficiently to raise it to the final vulcanizing temperature.

11. The method of vulcanizing rubber articles, which consists in placing the articles to be vulcanized in a suitable receptacle, admitting into said receptacle heated water or an equivalent liquid in the form of a spray which plays upon the articles, and causing a forced circulation of water during the initial stage of vulcanization.

12. The method of vulcanizing rubber articles, which consists in placing the articles to be vulcanized in a suitable receptacle, admitting into said receptacle heated water or an equivalent liquid in the form of a spray which plays upon the articles, and then raising the water to the final vulcanizing temperature by the injection of a heating medium which simultaneously produces a forced circulation of water.

13. An apparatus for vulcanizing rubber articles in water or an equivalent liquid including, in combination, a heater adapted to contain the articles to be cured, and means for introducing the water into the heater under pressure, said means comprising a pipe having openings to cause the water to impinge against a wall of the heater or an equivalent obstruction to cause the water to be sprayed onto the articles.

14. An improvement in the method of vulcanizing rubber articles, which consists in spraying simultaneously or substantially so all of the articles with and gradually submerging them in water or an equivalent liquid in a heated condition.

15. An improvement in the method of vulcanizing rubber articles, which consists in gradually submerging the articles in heated water or an equivalent liquid and spraying simultaneously or substantially so all of said articles with water as the submerging operation proceeds.

16. The method of vulcanizing rubber articles, which consists in placing the articles to be vulcanized in a suitable receptacle, gradually submerging the articles in water or an equivalent liquid admitted into said receptacle in a multiplicity of streams distributed along the length of the receptacle to play upon the articles, heating the water sufficiently to raise it to the desired vulcanizing temperature, and causing the water as it rises within the receptacle to build up therein a pressure in excess of the prevailing temperature pressure until a predetermined point is reached.

17. The method of vulcanizing rubber articles, which consists in spraying simultaneously or substantially so all of the articles with water or an equivalent liquid and heating the water to vulcanizing temperature, maintaining the articles when the water is heated to a vulcanizing temperature under a pressure in excess of the prevailing temperature pressure, and varying said excess pressure independently of the temperature pressure; whereby the articles may be subjected to at different desired pressures above the prevailing temperature pressure at different stages of vulcanization.

18. The method of vulcanizing rubber articles, which consists in placing the articles to be vulcanized in a suitable receptacle, admitting water or an equivalent liquid into said receptacle to submerge the articles, and heating the water within the receptacle to the desired vulcanizing temperature by the injection of a heating medium which produces a forced circulation thereof.

19. The method of vulcanizing articles, which consists in placing the articles to be vulcanized in a suitable receptacle, admitting water or an equivalent liquid into said receptacle to submerge the articles, heating the water within the receptacle to the desired vulcanizing temperature by the injection of a heating medium which produces a forced circulation thereof, and during the setting period maintaining within the vulcanizing receptacle a pressure in excess of the vulcanizing temperature pressure.

20. The herein described method, which consists in vulcanizing rubber articles in water or a similar liquid heated to the desired temperature, and after vulcanization cooling the articles with water or an equivalent liquid heated to a temperature at or near the boiling point.

21. An improvement in the method of vulcanizing rubber articles in water or an equivalent liquid, which consists in carrying out a vulcanizing operation in a suitable receptacle, transferring the water after vulcanization to a suitable storage receptacle open to the atmosphere, and cooling off the vulcanized articles by subjecting them to contact with water drawn from said storage receptacle.

22. The method of vulcanizing rubber articles, which consists in subjecting the articles to be vulcanized to contact with water or an equivalent liquid heated to the desired vulcanizing temperature, applying to the articles before they become set a pressure in excess of the prevailing temperature pressure, and building up said excess pressure in stages, whereby the articles may be subjected to different desired pressures above the temperature pressure at different stages of vulcanization.

23. An apparatus for vulcanizing rubber articles in water or an equivalent liquid including, in combination, a suitable receptacle adapted to contain the articles to be vulcanized, means for forcing the water into said receptacle to submerge the articles and to build up therein a pressure in excess of the temperature pressure, means for heating the water to the desired vulcanizing temperature, and a plurality of selectively controlled valves whereby said excess pressure may be varied independently of the temperature pressure at different stages of vulcanization.

24. An apparatus for vulcanizing rubber articles in water or an equivalent liquid including, in combination, a suitable receptacle adapted to contain the articles to be vulcanized, means for forcing the water into said receptacle to submerge the articles, a plurality of selectively controlled valves operable to cause the water as it enters the receptacle to build up therein a pressure in excess of the temperature pressure, means for heating the water to the desired vulcanizing temperature, and means whereby a pressure medium may be admitted into the vulcanizing receptacle when desired to increase the excess pressure independently of the temperature pressure.

25. The method of vulcanizing rubber articles in water or a similar liquid, which consists in placing the articles to be vulcanized in a suitable receptacle, admitting water into said receptacle so as gradually to submerge the articles, heating the water to vulcanizing temperature, and causing the water as it rises within the receptacle to build up therein a pressure in excess of the temperature pressure.

26. The method of vulcanizing rubber articles in water or a similar liquid, which consists in placing the articles to be vulcanized in a suitable receptacle, admitting water into said receptacle so as gradually to submerge the articles, heating the water to vulcanizing temperature, and causing the water as it rises within the receptacle to build up therein a pressure in excess of the temperature pressure until the articles are submerged, and at or about that time subjecting the water to a still greater pressure.

27. The method of vulcanizing rubber articles in water or a similar liquid, which consists in placing the articles to be vulcanized in a suitable receptacle, admitting water into said receptacle so as gradually to submerge the articles, heating the water to vulcanizing temperature, and causing the water as it rises within the receptacle to build up therein a pressure in excess of the temperature pressure, and maintaining said excess pressure until the articles become set.

28. The method of vulcanizing rubber articles, which consists in placing the articles to be vulcanized in a suitable receptacle, admitting water or a similar liquid into said receptacle to submerge the articles, heating the water to vulcanizing temperature, maintaining the water under a pressure in excess of the prevailing temperature pressure before the water is heated to final vulcanizing temperature, and at or about that time subjecting the water to a still greater pressure.

29. The method of vulcanizing rubber articles, which consists in placing the articles to be vulcanized in a suitable receptacle, admitting water or an equivalent liquid into said receptacle to submerge the articles, heating the water within the receptacle to raise it to the desired vulcanizing temperature, causing a forced circulation of the water within the receptacle without withdrawing it therefrom as it is brought to said temperature, then discontinuing such forced circulation, and thereafter maintaining the water substantially at said temperature.

30. The method of vulcanizing rubber articles, which consists in placing the articles to be vulcanized in a suitable receptacle, admitting water or an equivalent liquid into said receptacle to submerge the articles, heating the water within the receptacle to raise it to the desired vulcanizing temperature, and after the water has been heated to said vulcanizing temperature applying and maintaining within the vulcanizing receptacle a pressure substantially higher than the vulcanizing temperature pressure.

31. An improvement in the method of vulcanizing rubber articles in water or an equivalent liquid, which consists in carrying out the vulcanizing operation in a suitable receptacle, transferring the water after vulcanization to a suitable storage receptacle, thereafter transferring the water to the same or a different vulcanizing receptacle for carrying out another vulcanizing operation, and supplying to the water after it is transferred to the vulcanizing receptacle sufficient heat to raise it to the desired vulcanizing temperature by the injection of a heating medium which produces a forced circulation of the water as it is heated to said temperature.

In testimony whereof I affix my signature.

LAURITS A. LAURSEN.